United States Patent [19]

Nabiullin et al.

[11] 3,920,475
[45] Nov. 18, 1975

[54] ALKALINE GALVANIC CELL

[76] Inventors: Faat Khatovich Nabiullin, 3 Mytischinskaya ulitsa, 14A, kv. 90; Zoya Mikhailovna Buzova, 3 Mytischinskaya ulitsa, 14A, kv. 78; Efim Mikhailovich Gertsik, Malo-Moskovskaya ulitsa, 3, kv. 92; Ivan Ivanovich Koval, Novo-Peschanaya ulitsa, 23/7, kv. 369; Vladimir Mikhailovich Maslov, ulitsa Medvedeva, 11/6, kv. 1; Ljudmila Nikolaevna Khamits, ulitsa Shirokaya, 24, kv. 83, all of Moscow, U.S.S.R.

[22] Filed: Mar. 21, 1974

[21] Appl. No.: 453,367

[52] U.S. Cl. ............................................. 136/86 A
[51] Int. Cl.² ...................................... H01M 29/02
[58] Field of Search .......... 136/86 A, 133, 136, 177

[56] References Cited
UNITED STATES PATENTS

| | | | |
|---|---|---|---|
| 2,050,174 | 8/1936 | Gordon | 136/136 |
| 2,085,269 | 6/1937 | Oppenheim | 136/136 |
| 2,759,038 | 8/1956 | Morsal | 136/177 |
| 3,615,860 | 10/1971 | Terlecke | 136/133 |

Primary Examiner—John H. Mack
Assistant Examiner—Hugh A. Feeley
Attorney, Agent, or Firm—Haseltine, Lake & Waters

[57] ABSTRACT

An alkaline galvanic cell comprising coaxially arranged positive and negative electrodes separated by an ion-permeable membrane; the positive electrode has a terminal which forms a housing, and the negative electrode has a bar terminal. There is a washer and a spacer, both of an electrically insulating material, mounted adjacent the end faces of the electrodes; and a seal assembly including a metal cap in contact with the bar terminal, and a gasket with a hub which is tightly fitted on the bar terminal. The gasket is made of an electrically insulating plastic material; the washer is located on the side of the metal cap, and is also provided with a hub tightly fitted on the bar terminal; the cap is provided with holes filled with the material of the gasket to form passages in the gasket body by punching so as to provide for air access to the positive electrode.

14 Claims, 10 Drawing Figures

ALKALINE GALVANIC CELL

The present invention relates to voltage supply sources, and more specifically to an alkaline galvanic cell.

Constructions of alkaline galvanic cells are known to prevent the electrolyte from leaking out of the cell housing, as well as protect the electrode materials against contact with air.

Thus, a known alkaline galvanic cell comprises a positive electrode having a terminal which forms a housing, and a negative electrode of pasty zinc having a bar terminal, the electrodes being arranged coaxially and separated by a ion-permeable membrane, a washer and a spacer of an electrically insulating material being mounted adjacent the end faces of the electrodes, and a seal assembly including a metal cap with a hub formed by reinforcing an electrically insulating plastic material.

With the above-described construction of an alkaline galvanic cell pressure is built up therein, since hydrogen, which is inevitably formed during the storage period due to the corrosion of zinc, practically cannot escape, and the presence thereof inside the cell results in impaired electrical performance of the cell.

Besides, such constructions of cylindrical cells have no provisions for air oxygen access to the positive electrode along the height and cross-section thereof, which is required for the improvement of the electrical performance of the cell.

It is an object of the invention to provide an alkaline galvanic cell wherein access of air oxygen is provided to the positive electrode along the height and cross-section thereof.

It is another object of the invention to provide for storage of the cell without air access inside the cell.

Still another object of the invention is to provide for the possibility of repeated charging of the cell as a storage cell, as well as for free gas escape from the cell both during the storage and the operation of the cell.

The above objects are accomplished in that in an alkaline galvanic cell which comprises a positive electrode having a terminal which forms a housing, and a negative electrode, preferably of pasty zinc, having a bar terminal, the electrodes are arranged coaxially and separated from each other by an ion-permeable membrane, with a washer and a spacer of an electrically insulating material being mounted adjacent the end faces of the electrodes, and a seal assembly located adjacent the washer and including a metal cap and a gasket with a hub formed by reinforcing an electrically insulating plastic material. According to the invention the washer is provided with a hub, the inside diameter of the hubs of the gasket and of the washer being smaller than the diameter of the bar terminal, and a metal cap is provided with holes to form passages in the body of the gasket by punching so as to ensure air access to the inside of the cell.

With this embodiment of the alkaline galvanic cell, where the passages are punched through directly prior to the beginning of the operation, air access to the positive electrode is ensured, while the penetration of the same air to the negative electrode is prevented due to the sealing of the hubs.

The passages ensuring air access to the positive electrode may be also made in the body of the seal assembly gasket beforehand, the passages being formed by making said gasket a composite of two parts inserted one into the other so as to define the passages therebetween. The outer part of the composite gasket may be made integral with a thin-walled hydrogen-proof membrane which is to removed prior to the beginning of the operation.

Where there are previously made passages in the body of the seal assembly gasket, it is advantageous to provide the cell with a cap of a plastic material, which is tightly fitted on the cell housing adjacent the passages, whereby air access inside the cell is prevented during the storage period.

The mass of the positive electrode is also preferably pressed into a perforated metallic shell which is externally provided with projections extending in parallel with the shell axis, the projections defining a uniform gap between the shall and the cell housing. This gap ensures free air access to the positive electrode along the entire height thereof and gas escape from the positive electrode during the charging of the cell as a storage cell.

The shell may be galvanically plated with nickel, preferably on the side which is in contact with the positive electrode.

In order to provide for air access to the positive electrode along the height and cross-section thereof, the body of the positive electrode is preferably provided with axially extending which are suggested to be made in an arcuate shape in cross-section. Axially extending passages are also preferably made in the body of the positive electrode to ensure gas escape.

In addition, a through opening for gas escape may be made in the seal assembly metal cap in a zone thereof which is adjacent the bar terminal of the negative electrode.

In order to provide for more reliable protection of the negative electrode against penetration of air, the seal assembly gasket reinforcing the metal cap is preferably provided with a rib adapted to be introduced into the ion-permeable membrance along the entire periphery of the end face thereof. The rib may be provided with an opening adjacent the base of the gasket that forms a reinforement with the cap.

Where the cell is to be operated as a storage cell, it is advantageous to provide the terminal of the negative electrode with a tubular plastic casing, a metal cup being press-fitted on one end of the casing so as to contact the terminal bar with its bottom portion.

It is also suggested to provide the plastic casing with a hub tightly compressing the terminal bar in the zone of the cup location.

In order to prolong the service life of the cell under continuous heavy load-discharge conditions it is expedient to introduce a particulated moisture retaining material such as wood flour, paper dust, sawdust and the like into the gelling agent of the ion conductive diaphragm, i.e., starch.

The alkaline galvanic cell according to the invention may be a cell for at least 20 charging cycles, and a cell with manganese-air depolarization.

The invention will be better understood from the following detailed description of specific embodiments of the alkaline galvanic cell with reference to the accompanying drawings, in which.

Figure 1:
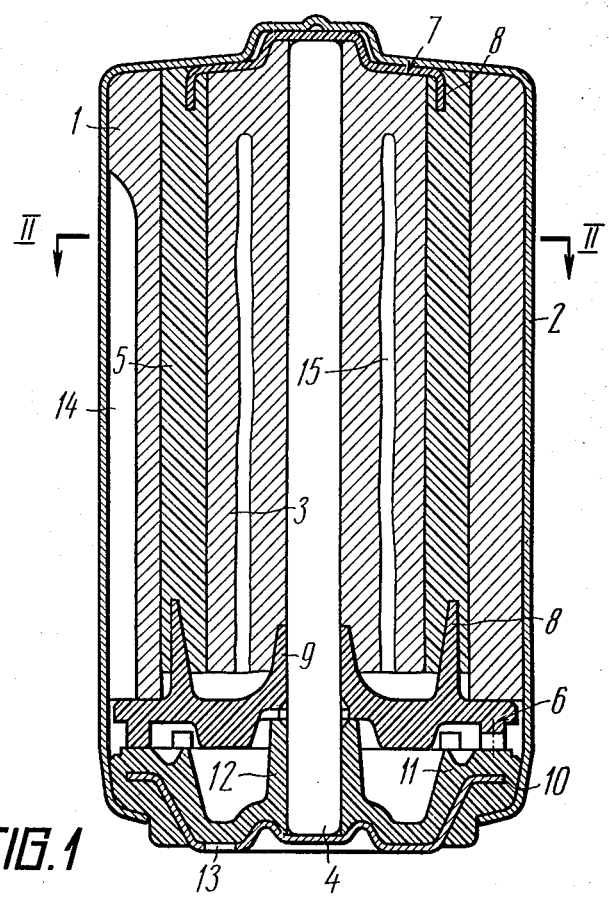
FIG. 1 shows a longitudinal sectional view of a first exemplary embodiment of an alkaline galvanic cell according to the invention wherein a seal assembly cap is provided with holes, a washer mounted adjacent the cap is provided with a hub, and positive and negative electrodes are provided with passages.

Referring to FIG. 1, the first embodiment of the inventive alkaline galvanic cell comprises a positive electrode 1 having a terminal 2 which forms a housing of the cell, and a negative electrode 3 preferably of pasty zinc, having a bar terminal 4. As shown in FIG. 1, the positive electrode 1 and the negative electrode 3 are arranged coaxially and are separated from each other by an ion-permeable membrane 5. Mounted on one side adjacent the end faces of the electrodes 1 and 3 is a washer 6, and a spacer 7 of an electrically insulating material is located on the other side adjacent to the end faces of the electrodes, both the washer and the spacer having an annular rib 8 which partly protrudes into the ion-permeable membrane 5 along the entire periphery of the end face thereof.

The washer 6 is provided with a hub 9 which is tightly fitted on the bar terminal 4 of the negative electrode 3. Located adjacent the washer 6 is the seal assembly of the cell which comprises a metal cap 10 and a gasket 11 having a hub 12, which is also tightly fitted on the terminal 4, the gasket being formed by reinforcing an electrically insulating plastic material.

In this embodiment the inside diameter of the hub 9 and the washer 6, as well as the inside diameter of the hub 12 of the gasket 11 are smaller than the diameter of the bar terminal 4, whereby the above-mentioned parts can be tightly fitted on the terminal.

The outer surface of the metal cap 10 constitutes the negative contact of the cell. The gasket 11 with the hub 12 is made of a plastic which is non-wettable with alkali, such as polyethylene. The central part of the cap 10 is supported by the bar terminal 4 extending through the hub 12. The hub 12, which is compressed around the terminal 4, prevents alkali from penetrating to the cap 10. The cap 10 is pressed against the terminal 4 through the interposition of the gasket 11 by a peripherally rolled edge of the cell housing, which in this case is the terminal 2. Holes 13 are spaced along the periphery of the cap 10 and filled with the plastic material of the gasket 11, the holes being adapted to form passages in this material to ensure air access inside the cell by punching, which is effected prior to the beginning of the operation of the cell.

Figure 2:
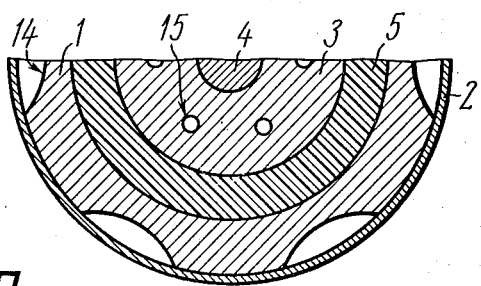
FIG. 2 is a sectional view taken along the line II—II in FIG. 1.

In order to provide for free access of air oxygen to the positive electrode 1 along the height and cross-section thereof, as well as for hydrogen escape from the negative electrode 3 without deformation thereof, axially extending passages 14 (FIGS. 1, 2) are made in the body of the positive electrode 1, which are preferably of arcuated shape in the cross-section, and the body of the negative electrode is also provided with axially extending passages 15.

Figure 3:
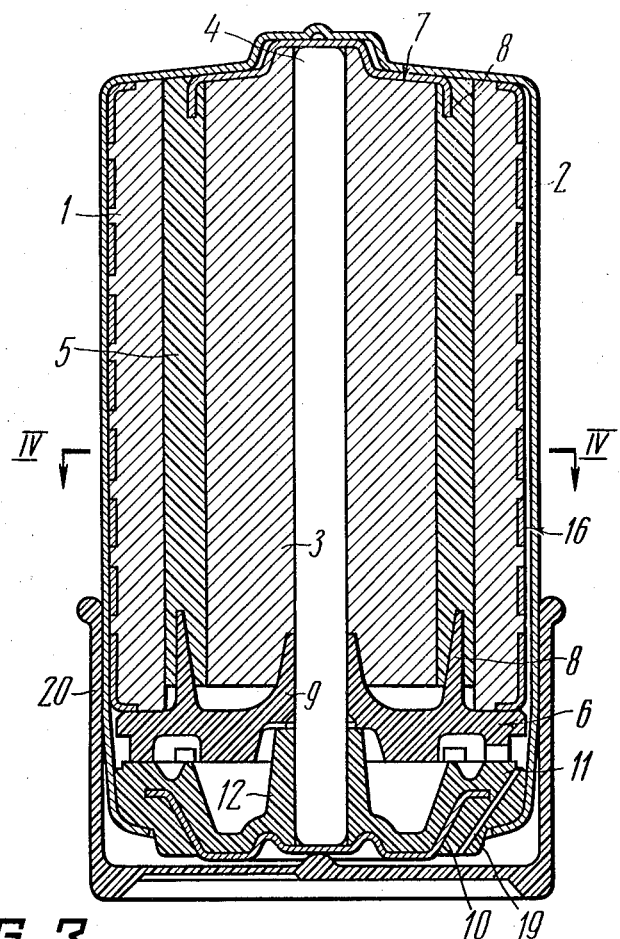
FIG. 3 shows a longitudinal sectional view of a modified alkaline galvanic cell wherein a seal assembly gasket is provided with passages extending in the body thereof, the mass of the positive electrode being pressed into a shell, and the cell is provided with a cap.
Figure 4:
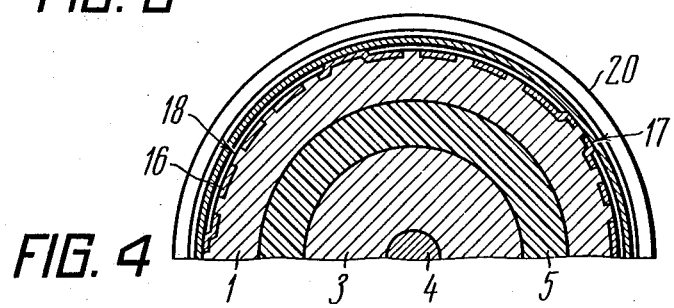
FIG. 4 is a sectional view taken along the line IV—IV in FIG. 3.
Figure 5:
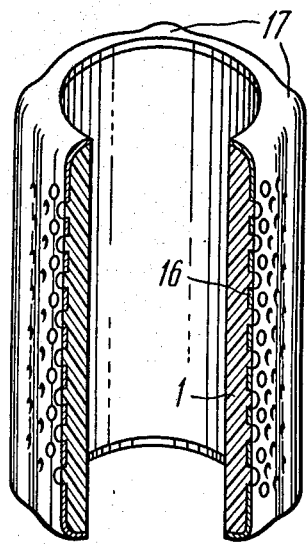
FIG. 5 shows a general view of the shell with the positive electrode shown in FIGS. 3, 4.

FIG. 3 shows a modified embodiment of the alkaline galvanic cell, in which the mass of the positive electrode 1 is pressed into a shell 16 (FIGS. 3, 4) mounted in the housing 2 of the cell. The shell 16 comprises a perforated metallic component and is galvanically plated with nickel. The shell is externally provided with projections 17 (FIGS. 4, 5) extending in parallel with the shell axis and adapted to define a uniform gap 18 between the cell housing 2 and the shell 16. The gap 18 provides for air oxygen access to the positive electrode 1 along the height and cross-section thereof.

The shell 16 is made of a steel band or sheet which is galvanically plated with nickel on the side in contact with the mass of the positive electrode 1. The outer surface of the sheel 16 may have no coating. The edges of the shell 16 are rolled. Electric contact between the shell 16 and the housing 2 is ensured by means of the projections 17 and the rolled edge of the shell which rests against the bottom wall of the housing 2.

In this embodiment of the alkaline galvanic cell air access inside the cell is ensured by means of passages 19 made in the body of the gasket 11 of electrically insulating plastic material.

In order to ensure long-term storage of the cell (to prevent air from penetrating inside the cell during the storage period), the cell is provided with a cap 20 of a plastic material, such as of polyethylene, which is tightly fitted on the cell housing on the side of the metal cap 10. The central postion of the cap 20 is made thinner so as to ensure hydrogen escape from the cell. The cap may be used repeatedly, that is it may be removed for operation of the cell and then put on the cell again for a long-term storage period.

Figure 6:
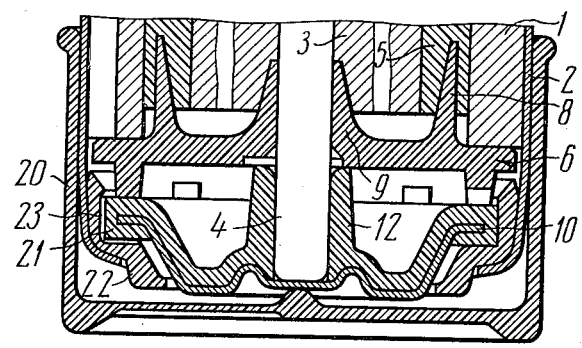
FIG. 6 shows a partial view of another alkaline galvanic cell wherein the seal gasket is made as a composite of two parts so as to define passages for air access therebetween.

FIG. 6 shows a seal assembly of another alkaline galvanic cell in which the gasket of electrically insulating plastic material is made as a composite of two parts 21 and 22 inserted one into the other so that a passage 23 is formed therebetween to ensure air access inside the cell.

Figure 7:
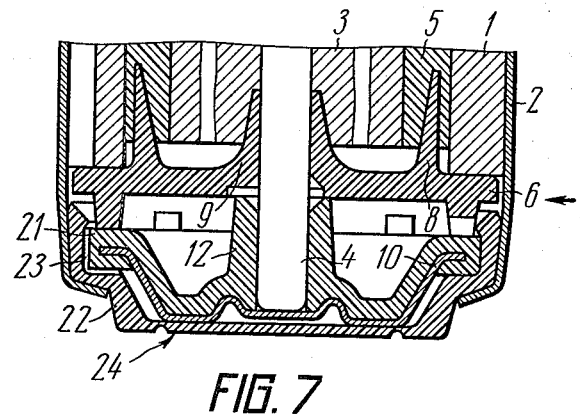
FIG. 7 shows a partial view of a further alkaline galvanic cell wherein the outer part of the composite gasket is made integral with a thin-walled membrane.

The outer part 22 of the composite gasket may be made integral with a thin-walled membrane 24 which is permeable to hydrogen, as shown in FIG. 7 for a further exemplary cell embodiment. The membrane 24 is removed prior to the beginning of the operation.

Figure 8:
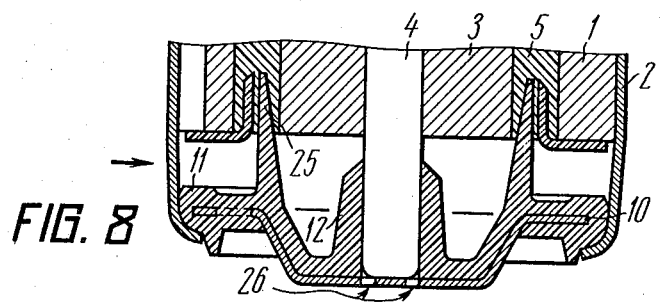
FIG. 8 shows a partial view of yet another alkaline galvanic cell wherein a through opening is provided in the seal assembly cap in a zone adjacent to a bar terminal.

FIG. 8 shows yet another embodiment of a cell with a seal assembly wherein the gasket 11 reinforcing the metal cap 10 is provided with an annular rib 25 introduced into the ion-permeable membrane along the entire periphery of the end face thereof, while the cap 10 is provided with a through opening 26 in the zone thereof adjacent to the bar terminal 4.

The rib 25 introduced into the ion-permeable membrane 5 protects the negative electrode 3 against penetration of air oxygen thereto, while the opening 26 eensures hydrogen escape from the cell during the storage period.

Figure 9:
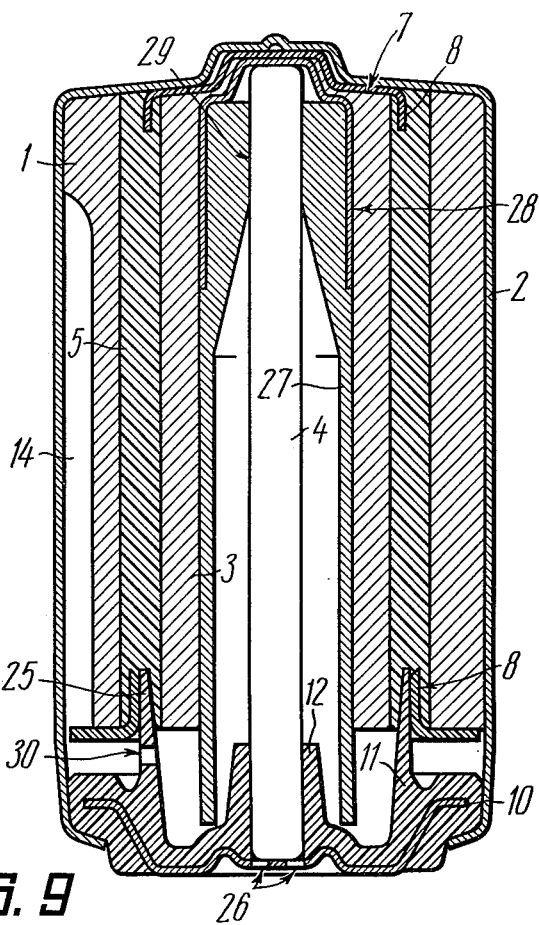
FIG. 9 shows a further modified alkaline galvanic storage cell wherein the negative electrode terminal, comprising a metal cup, is provided with a tubular plastic casing.
Figure 10:
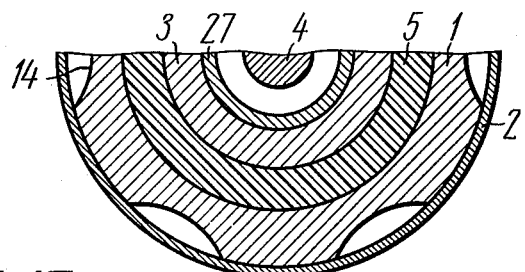
FIG. 10 is a sectional view taken along the line X—X in FIG. 9.

Finally, FIGS. 9 and 10 show a further modified embodiment of the cell, to be used preferably as a storage cell (under charge-discharge conditions).

The terminal 4 is provided with a plastic casing 27, a metal terminal 28 of the negative electrode, which preferably comprises a cup, being press-fitted on one end of the casing.

The plastic casing 27 is provided with a hub 29 tightly compressing the terminal 4, one end of the terminal being in contact with the cup 28, and other end being in contact with the cap 10 in the zone of the opening 26. In this embodiment the passages 14 of the positive electrode 1 contribute to oxygen escape from the internal of the electrode during the charging of the cell so that the oxygen escapes into atmosphere through an opening 30 in the rib 25 and the opening 26 in the cap 10.

The ion-conductive diaphragme 5, shown in FIGS. 1-4 and 6-10, is manufactured by the introduction of a particulated bibulous moisture-retaining material, for instance wood flour as an additive to the gelling starch. The approximate composition of the ion conductive diaphragme is 65 g starch and 130 g wood flour per litre of electrolyte. Other materials, for instance sawdust, paper or cotton dust and the like may be used as the additive.

What is claimed is:

1. An alkaline galvanic cell comprising: a positive electrode having a terminal, the latter embracing one of the end faces and the peripheral surface of said positive electrode, forming at the same time a housing for the cell; a negative electrode having a bar terminal extending through said negative electrode; said electrodes being arranged coaxially and separated by an ion-permeable membrane; a spacer of an electrically insulating material to prevent short-circuits between said electrodes, mounted between said positive terminal and the end face of said negative electrode on one side of the cell; a washer of an electrically insulating material mounted adjacent the opposite end faces of said electrodes on the other side of the cell and provided with a hub fitted on said bar terminal; and a seal assembly including a gasket of an electrically insulating plastic material made with a hub fitted on said bar terminal on the side of said washer with its hub, and a metal cap incorporated into the material of said gasket for mutual reinforcement, said cap being in contact with said bar terminal; said washer and said gasket with the respective hubs having an inside diameter smaller than the diameter of said bar terminal so as to be tightly fitted thereon; said cap being provided with holes at least partly filled with the material of said gasket to form passages in the body of the latter by punching, whereby air access is ensured to said positive electrode.

2. The alkaline galvanic cell as defined in claim 1, wherein the body of said positive electrode has therein axial passages for air access to said positive electrode and gas escape therefrom.

3. The alkaline galvanic cell as defined in claim 1, wherein said cap has therein a through opening in a zone thereof adjacent said bar terminal for gas escape.

4. The alkaline galvanic cell as defined in claim 1, wherein said positive electrode is constituted by a mass pressed into a perforated metallic shell which is externally provided with projections extending substantially in parallel with the axis of said shell, said projections defining a uniform gap and contact between said shell and said positive terminal that constitutes said housing.

5. The alkaline galvanic cell as defined in claim 4, wherein said shell has a galvanic nickel plating on the side which is in contact with said positive electrode.

6. The alkaline galvanic cell as defined in claim 1, wherein said body of the gasket has passages therein for air access to said positive electrode.

7. The alkaline galvanic cell as defined in claim 6, further comprising a cap of a plastic material tightly fitted on said housing on the side of said passages in the body of said gasket so as to prevent air from penetrating through these passages during the storage period.

8. The alkaline galvanic cell as defined in claim 6, wherein said gasket is made as a composite of two parts inserted one into the other so as to define said air-access passages therebetween.

9. The alkaline galvanic cell as defined in claim 8, wherein the body of said negative electrode has therein axial passages for gas escape therefrom.

10. The alkaline galvanic cell as defined in claim 8, wherein the outer part of said composite gasket is made integral with a temporary thin-walled hydrogen-permeable membrane which is removed prior to the assembly of the cell.

11. The alkaline galvanic cell as defined in claim 8, wherein said gasket has a rib that partly protrudes into said membrane along the entire periphery of the end face thereof.

12. The alkaline galvanic cell as defined in claim 11, wherein said bar terminal is provided with a plastic casing having at one end a metallic terminal of said negative electrode press-fitted thereon.

13. The alkaline galvanic cell as defined in claim 12, wherein said casing has a hub tightly compressing said bar terminal.

14. The alkaline galvanic cell as defined in claim 13, wherein said rib of the gasket has an opening adjacent the base of said gasket.

* * * * *